(12) United States Patent
Chen (10) Patent No.: US 9,293,108 B2
(45) Date of Patent: Mar. 22, 2016

(54) TRANSMISSION APPARATUS AND SYSTEM OF USING THE SAME

(71) Applicant: Prolific Technology INC., Taipei (TW)

(72) Inventor: Chiun-Shiu Chen, Taipei (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 202 days.

(21) Appl. No.: 13/741,499

(22) Filed: Jan. 15, 2013

(65) Prior Publication Data

US 2013/0181957 A1    Jul. 18, 2013

Related U.S. Application Data

(60) Provisional application No. 61/587,199, filed on Jan. 17, 2012.

(51) Int. Cl.
| | |
|---|---|
| *G06F 13/10* | (2006.01) |
| *G09G 5/00* | (2006.01) |
| *G06F 3/14* | (2006.01) |
| *H04W 48/18* | (2009.01) |

(52) U.S. Cl.
CPC ............... *G09G 5/00* (2013.01); *G06F 3/1454* (2013.01); *G06F 13/105* (2013.01); *H04W 48/18* (2013.01); *G09G 2354/00* (2013.01)

(58) Field of Classification Search
CPC .... G09G 5/00; G09G 2354/00; G06F 3/1454; G06F 13/105; H04W 48/18
USPC .......................................................... 345/204
See application file for complete search history.

(56) References Cited

U.S. PATENT DOCUMENTS

| | | | | |
|---|---|---|---|---|
| 2004/0253991 | A1* | 12/2004 | Azuma ........................ | 455/566 |
| 2005/0033880 | A1* | 2/2005 | Lin ..................... | G06F 13/4027 710/52 |
| 2005/0132299 | A1* | 6/2005 | Jones et al. .................... | 715/759 |
| 2007/0165038 | A1* | 7/2007 | Chiba et al. ................... | 345/520 |
| 2008/0115073 | A1* | 5/2008 | Erickson et al. ............... | 715/766 |

\* cited by examiner

*Primary Examiner* — Ariel Balaoing
(74) *Attorney, Agent, or Firm* — WPAT, PC; Justin King (57) ABSTRACT

A transmission system includes a transmission apparatus, a first electronic device and a second electronic device electrically connected to one another. The first electronic includes a composite driver, a first application program, a first display image and a virtual display device. The first composite driver emulates the virtual display device according to the first display image. The second electronic device includes a second application program and a second display image. The transmission interface includes a transmission controller and two transmission interfaces. The two transmission interfaces are connected to the first electronic device and the second electronic device, respectively. When the first application program transmits output data corresponding to the virtual display device via the two transmission interfaces and the transmission controller to the second application program, a virtual display image corresponding to the first display image is presented on the second display image.

8 Claims, 6 Drawing Sheets

TRANSMISSION APPARATUS AND SYSTEM OF USING THE SAME

FIELD OF THE INVENTION

The present invention relates to a communication technique, and more particularly, a cross-platform transmission apparatus having an operation window of a virtual device and an associated operation method.

BACKGROUND OF THE INVENTION

With diversified developments of information platforms, previously clearly distinguished product definitions of three dominant platforms namely computers (including desktop computers, laptop computers and portable pads), televisions and mobile handsets have gradually obscured under the trends of platform smartening and media information streaming. In response to the needs of data exchange and data synchronization across different platforms as well as various operating systems (e.g., iOS, Blackberry OS, Android and Windows), a variety of cross-platform applications are derived.

A conventional transmission apparatus connects two electronic devices in a way that a window operation associated with the two electronic devices can be implemented through firmware and software means. However, in a conventional system structure, data exchange or update can only be performed given that display devices connected or designated to the two electronic devices are turned on. In other words, a user is required to at the same time monitor two display images, implying that a distance between the two connected electronic devices is limited. Further, certain portable electronic devices (e.g., mobile handsets and portable pads) are equipped with a smaller-sized display device that makes viewing or editing operations unfavorable.

Figure 1:
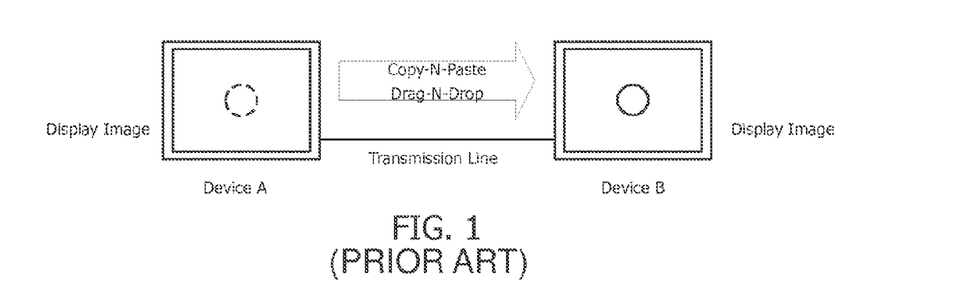
FIG. 1 is a schematic diagram of an electronic device A and an electronic B tied together by a conventional transmission apparatus.

FIG. 1 shows a schematic diagram of a conventional transmission apparatus connecting an electronic device A and an electronic device B. The conventional transmission apparatus is generally implemented in form of a transmission line. As shown in FIG. 1, display devices designated to the electronic devices A and B are at the same time turned on during a file sharing operation between the electronic devices A and B via a transmission line. A user needs to at the same time monitor images of the two display devices in order to operate functions such as copying-and-pasting and dragging-and-dropping. Further, results of executed application programs at the electronic devices A and B can only be presented on the images of respective display devices.

Figure 2:
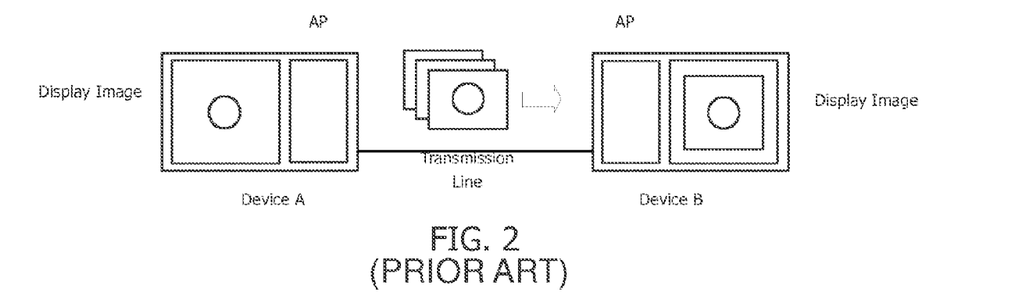
FIG. 2 is a schematic diagram of the two electronic devices A and B executing a remote desktop operation through the conventional transmission apparatus.

FIG. 2 shows a schematic diagram of a remote desktop operation between the electronic devices A and B via a transmission line. More specifically, at the electronic device A, an application program is executed for continuously capturing desktop snapshots in a frame buffer of a display card. The captured snapshots are compressed or processed by another mechanism for reducing a data amount, transmitted to the electronic device B, received by an application program at the electronic device B, decompressed, and then presented on a display image. The above conventional solution suffers from certain setbacks. For example, if an output results from a particular program (e.g., video playback software) cannot be intercepted or if data is lost, a program compatibility complication is incurred. For another example, when the display device of the electronic device is a small-sized display as such in a mobile handset or a portable pad, the intercepted image data may render unsatisfactory image quality when displayed at a larger-sized display device of the other electronic device.

SUMMARY OF THE INVENTION

The disclosure is directed to a transmission apparatus and associated method for connecting a first electronic device and a second electronic device. As such, the first electronic device may be automatically or manually displayed in form of a virtual device as a single window or a full screen on a display image of the second electronic device. Further, the second electronic device may perform functions including, for example, browsing, editing, clicking, copying-and-pasting, and dragging-and-dropping between the first and second electronic devices. An execution result of the first electronic device may also be presented on a display image of the second electronic device. The first and second electronic devices are not limited to operating under the same operating system and window manager.

With the transmission apparatus and method of the disclosure, in addition to intuitively operating a local electronic device through a single display image, by connecting to another electronic device via the transmission apparatus, a user is also allowed to operate functions including browsing and resource sharing, for example, video watching, file copying, network sharing, human-machine-interface (HMI) and functions of other devices.

According to an exemplary embodiment of the disclosure, a transmission apparatus is provided. The transmission apparatus is electrically connected to a first electronic device and a second electronic device. The first electronic device includes a composite driver, a first application program, a first display image and a virtual display device. The composite driver emulates the virtual display device according to the first display image. The second electronic device includes a second application program and a second display image. The transmission interface includes a transmission controller and two transmission interfaces. The two transmission interfaces are connected to the first electronic device and the second electronic device, respectively. When the first application program transmits output data corresponding to the virtual display device to the second application program via the two transmission interfaces and the transmission controller, a virtual display image corresponding to the first display image is presented on the second display image.

According to another exemplary embodiment of the disclosure, a transmission system using the above transmission apparatus is provided. The transmission system includes: a first electronic device, having a composite driver, a first application program, a first display image and a virtual display device, wherein the first composite driver emulates the virtual display device according to the first display image; a second electronic device, having a second application program and a second display image; and a transmission controller, electrically connected to the first electronic device and the second electronic device via two transmission interfaces, respectively. When the first application program transmits output data corresponding to the virtual display device to the second application program via the two transmission interfaces and the transmission controller, a virtual display image corresponding to the first display image is presented on the second display image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

Figure 3:
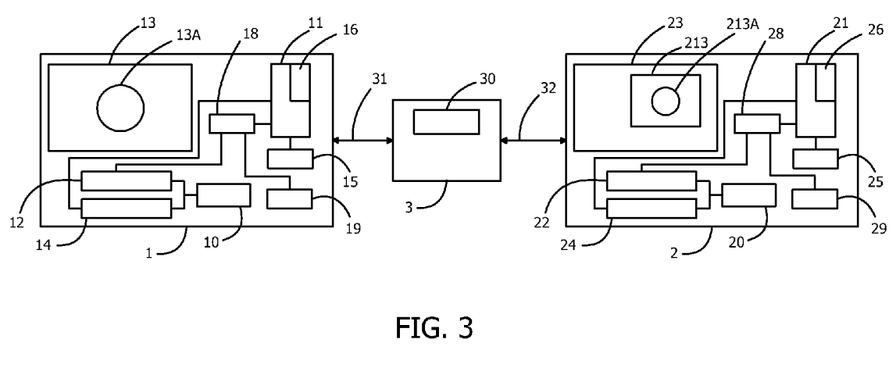
FIG. 3 is a block diagram of a transmission apparatus according to a preferred embodiment of the disclosure.

FIG. 3 shows a block diagram of a transmission apparatus according to a preferred embodiment of the present invention. A transmission apparatus 3 according to the embodiment includes a transmission controller 30 and two transmission interfaces 31 and 32. For example, either of the transmission interfaces 31 and 32 is a hot-plug and plug-and-play transmission interface, such as Universal Serial Bus, preferably. As shown in FIG. 3, the transmission apparatus 3 is electrically connected to a first electronic device 1 and a second electronic device 2 via the transmission interfaces 31 and 32, respectively.

The first electronic device 1, connected to the transmission apparatus 3 via the transmission interface 31, possesses a first composite driver 10 and a first application program 11. The first composite driver 10 emulates a first virtual display device 12 at the first electronic device 1, and transmits output data of the first virtual display device 12 by the first application program 11 to the transmission controller 30 via the transmission interface 31.

Similarly, the second electronic apparatus 2, connected to the transmission apparatus 3 via the transmission interface 32, possesses a second composite driver 20 and a second application program 21. The second composite program 20 emulates a second virtual display device 22 at the second electronic device 2, and transmits output data of the second virtual display device 22 by the second application program 21 to the transmission controller 30 via the transmission interface 32.

According to a transmission protocol agreed between the first application program 11 and the second application program 21, the transmission controller 30 disposed in the transmission apparatus 3 selectively hands over the output data, sent via the transmission interface 31 by the first application program 11, to the second application program 21 via the transmission interface 32. The output data is presented on a display image 23 of the second electronic device 2 by the second application program 21. Similarly, according to a transmission protocol agreed between the first application program 11 and the second application program 21, the transmission controller 30 selectively hands over the output data, sent via the transmission interface 32 by the second application program 21, to the first application program 11 via the transmission interface 31. The output data is presented on a display image 13 of the first electronic device 1 by the first application program 11.

Referring to FIG. 3, the display image 13 of the first electronic device 1 is emulated to be the first virtual display device 12 by the first composite driver 10, and hands over the output data of the first virtual display device 12 by the first application program 11 to the transmission controller 30 via the transmission interface 31. In other words, the first virtual display device 12 mirrors the display image 13 rendered onto the first physical display device 19 and transmits the mirror to the transmission controller 30. According to the communication protocol agreed between the first application program 11 and the second application program 21, the transmission controller 30 hands over the output data, sent via the transmission interface 31 by the first application program 11, to the second application program 21 via the transmission interface 32. The output data is presented on the display image 23 of the second electronic device 2 by the second application program 21. A display image presented on the display image 23 of the first electronic device 1 is a corresponding display image 213. Thus, the display image 13 of the first electronic device 1 is embedded to the display image 23 of the second electronic device 2. That is to say, the first electronic device 1 is presented at the second electronic device 2 in a virtual manner.

Again referring to FIG. 3, the first composite driver 10 emulates a first virtual human-machine interface (HMI) device 14 at the first electronic device 1, and the first application program 11 determines input data to the first virtual HMI device 14. The second composite driver 20 emulates a second HMI device 24 at the second electronic device 2, and the second application program 21 determines input data to the second virtual HMI device 24.

The first electronic device 1 further includes a first physical HMI device 15. The first application program 11 decides whether to send output data of the first physical HMI device 15 to the transmission controller 30 via the first transmission interface 31. Similarly, the second electronic device 2 further includes a second physical HMI device 25. The second application program 21 decides whether to send output data of the second physical HMI device 25 to the transmission controller 30 via the second d transmission interface 32.

According to a communication protocol agreed between the first application program 11 and the second application program 21, the transmission controller 30 selectively hands over the output data sent by the first application program 11 to the second virtual HMI device 24, and the second application program 21 forwards the output data to the second virtual HMI device 24, so as to emulate an HMI operation at the second electronic device 2. Alternatively, the transmission controller 30 selectively hands over the output data sent by the second application program 12 to the first virtual HMI device 14, and the first application program 11 forwards the output data to the first HMI device 14, so as to emulate an HMI operation at the first electronic device 1.

For example, either the first electronic device 1 or the second electronic device 2 is a mobile handset, a portable pad, a laptop computer, a desktop computer or a television, which is equipped with hot-plug and plug-and-play transmission interface connectors. For example, either the first physical HMI device 15 or the second physical HMI device 25 is a keyboard, a mouse or a touch screen.

Preferably, either the virtual display devices 12 or 22 is a virtual VGA card. Details of how data of the display images 13 and 23 is transmitted to another electronic device via the virtual display devices 12 and 22 as well as the transmission interfaces 31 and 32 are described below.

Again referring to FIG. 3, the first electronic device 1 and the second electronic device 2 are disposed with a physical display device 19 and a physical display device 29, respectively. The physical display devices 19 and 29 are generally implemented through display cards. Taking an example of sending the display image 13 of the first electronic device 1 to the second electronic device 2, the operating system of the first electronic device 1 calls a graphics library (e.g., Direct3D or OpenGL), and presents the display image 13 on a local display screen through the physical display device 19. According to the disclosure, a filter driver 18 is constructed at a display driver. The filter driver 18 can be, for example, implemented by software. Upon activating the filter driver 18 by the application program 11, the filter driver 18 intercepts a command calling the graphics library and intended for the physical display device 19, and hands over the command to the virtual display device 12. The virtual display device 12 then sends the output data associated with the image to the electronic device 2 via the transmission interface 31, the transmission controller 30 and the transmission interface 32. The application program 21 receives the output data and presents the corresponding display image 213 on the display image 23.

It should be noted that, the display driver originally stored in the operating system is used for driving the physical display device. As the filter driver is additionally provided for implementing the disclosure, the filter driver may also be included in the composite drivers 10 and 20.

Example

An example of the electronic device 2 controlling the electronic device 1 will be given in the embodiment.

After tying the electronic devices 1 and 2 via the transmission apparatus 3, the electronic device 1 is installed with the composite driver 10 to generate the virtual HMI device 14 and the virtual display device 12, and is also installed with the application program 11 in form of a background process. Similarly, the electronic device 2 is installed with the application program 21 also in form of a background process, and is equipped with the physical HMI device 25.

Figure 4:
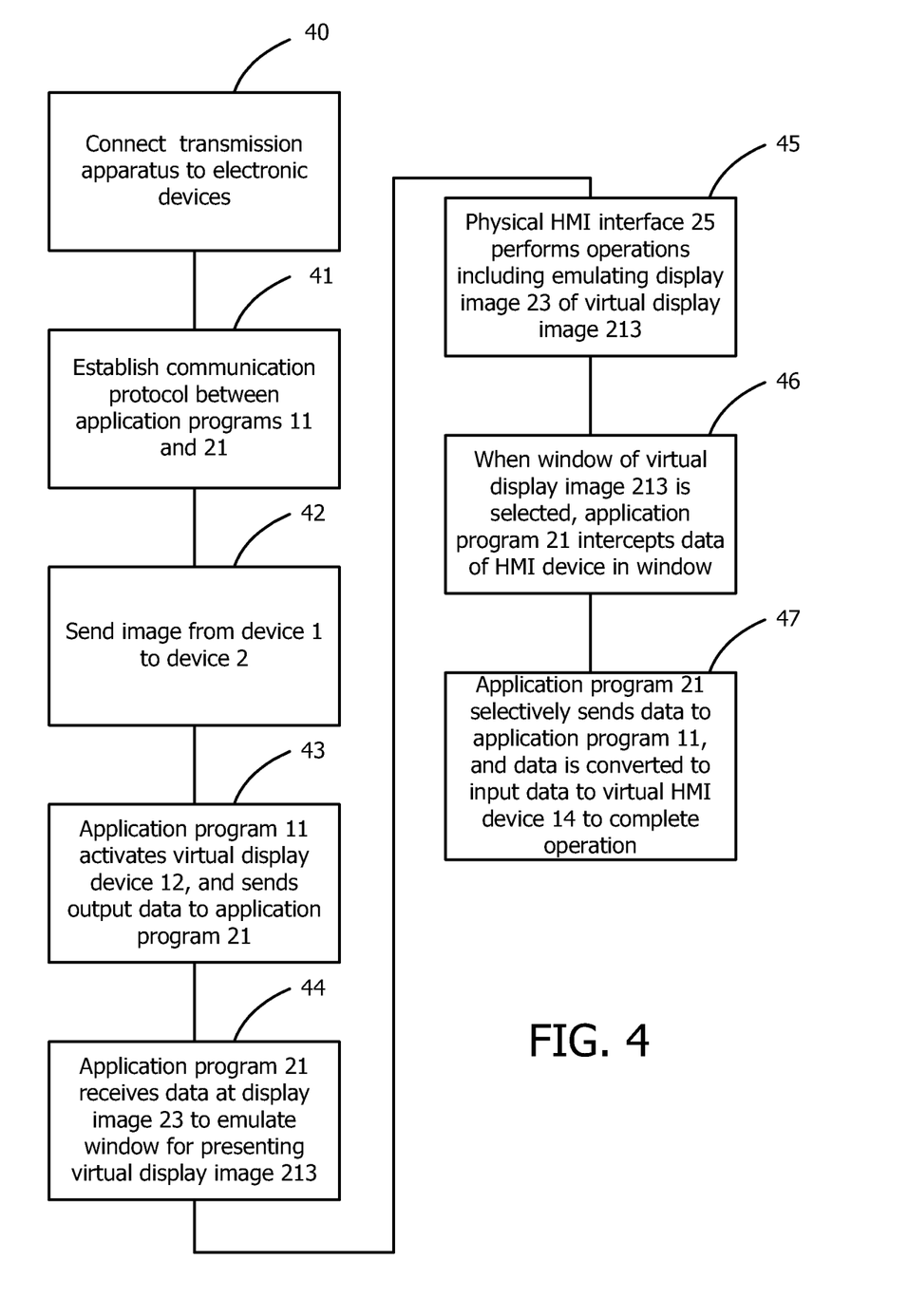
FIG. 4 is a control method according to a preferred embodiment of the disclosure.

FIG. 4 shows a flowchart of a control method for a transmission apparatus according to a preferred embodiment. In step 40, the transmission apparatus 30 having hot-plug interfaces is electrically connected to the electronic devices 1 and 2. In step 41, a predetermined communication protocol is established by the corresponding application programs 11 and 21 of the electronic devices 1 and 2, respectively, via the transmission controller 30 of the transmission apparatus 3. In step 42, according to the agreed protocol, the application programs 11 and 21 determined the manner how to send the display image 13 of the electronic device 1 to the electronic device 2. In step 43, the application program 11 activates the virtual display device 12, and sends its output data to the application program 21 via the transmission interface 31, the transmission controller 30 and the transmission interface 32. For example, after connecting the transmission apparatus of the disclosure to a personal computer or a laptop computer with a mobile handset, a display image of the mobile handset may be presented on a display screen of the personal computer or the laptop computer.

In step 44, the application program 21 presents the display image 23 received at the electronic device 2 by a corresponding window of the virtual display image 213. In step 45, a user manipulates the physical HMI device 25 of the electronic device 2 to operate, for example, the display image 23 of the window of the virtual display image 213. Step 46 is performed if the virtual display image 213 corresponding to the display image 13 of the electronic device 1 is selected, in which the application program 21 intercepts the HMI data of a cursor within the window range. In step 47, the application program 21 selectively sends the intercepted data to the application program 11 via the transmission interface 32, the transmission controller 30 and the transmission interface 31. The application program 11 converts the received data to input data to the virtual HMI device 14 and accomplishes the operation. Accordingly, it is in equivalence directly connecting the physical HMI device 25 to the first electronic device 1, in a way that the physical HMI device 25 is enabled to operate the first electronic device 1. Assuming the first electronic device 1 is a mobile handset or a portable pad having a smaller-sized screen, manipulations may be carried out via the physical HMI device 25 (e.g., a mouse or a keyboard) of the second electronic device 2 to optimize the ease of use.

Several basic functions manipulated in the window are discussed below.

1. Clicking or Double-Clicking

Figure 5:
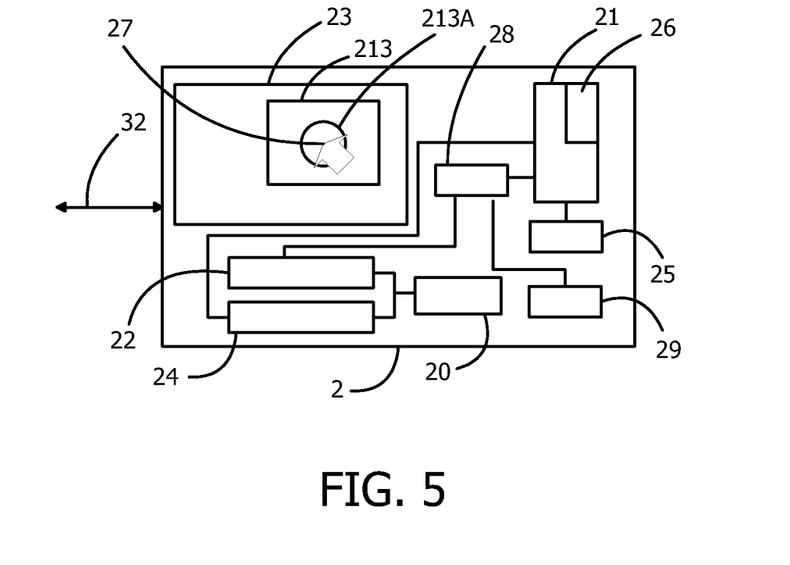
FIG. 5 is a schematic diagram of a clicking function.

FIG. 5 shows a schematic diagram of a clicking function. The clicking function is may be either left-clicking a mouse once or left-clicking the mouse twice continuously. The two operations are similar and will be jointly described. In FIG. 5, only one side of the electronic device 2 is depicted. Operation details within the range of the window of the virtual device 213 are as described below.

When a cursor 27 selects an object 213A at the virtual display image 213, the application program 23 calculates coordinates of the cursor 27 at the virtual display image 213 and clicked data (e.g., a left-click or right-click of the mouse) of the cursor, and sends the data to the application program 11 via the transmission interface 32, the transmission controller 30 and the transmission interface 31. The application program 11 forwards the data to the virtual HMI device 14 to emulate the selected object 13A and thus produces an image change.

2. Menu

Figure 6:
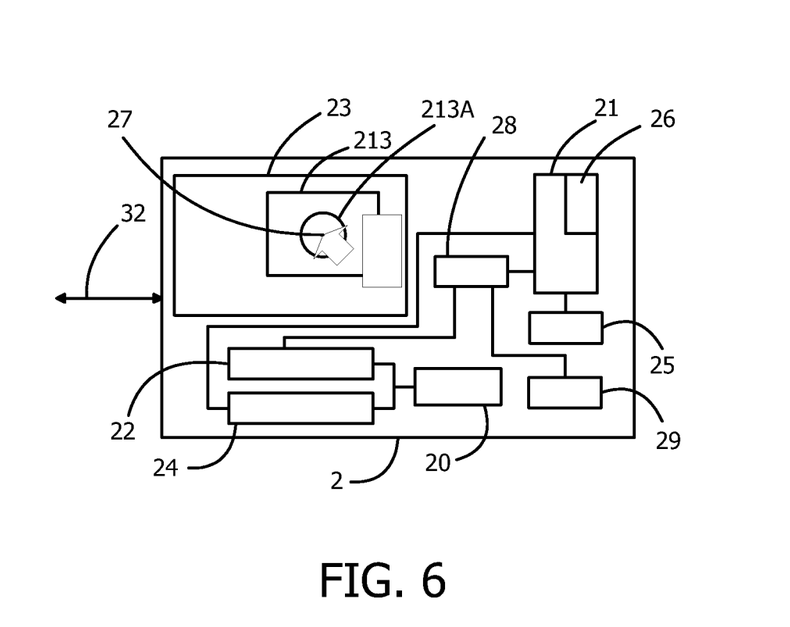
FIG. 6 is a schematic diagram of a Menu-a function.
Figure 7:
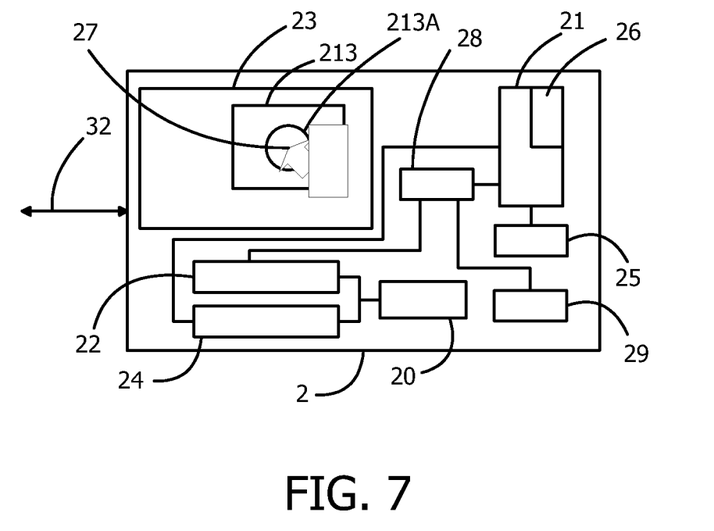
FIG. 7 is a schematic diagram of a Menu-b function.

FIGS. 6 and 7 are schematic diagrams of a menu function. The menu function is right-clicking the mouse once. Operation details within the range of the window of the virtual display image 213 may be divided into two categories to be described in detail shortly—(1) Menu-a: The window manager of the electronic device 1 supports a mouse right-clicking menu (as shown in FIG. 6); and (2) Menu-b: The window manager of the electronic device 1 does not support a mouse right-clicking menu (as shown in FIG. 7).

Referring to FIG. 6, when the cursor 27 selects the object 213A, the application program 21 calculates coordinates of the cursor 27 at window of the virtual display image 213 and data of right-clicking the mouse. The data is handed over to the application program 11 via the transmission interface 32, the transmission apparatus 30 and the transmission interface 31. The application program 11 then forwards the data to the HMI device 14 to generate a menu, and records the object and command to the buffer 16 according to the selected command listed on the menu.

Referring to FIG. 7, when the cursor 27 selects the object 213A, the application program 23 calculates the coordinates of the cursor 27 at the virtual display image 213, and hands over the data to the application program 11 via the transmission interface 32, the transmission controller 30 and the transmission interface 31. The application program 11 then forwards the data to the HMI interface 14 and temporarily stores the object to the buffer 16. The application program 21 generates a menu and sends a command to the application program 11 to be stored in the buffer 16.

A copying function between the electronic devices 1 and 2 may be achieved through comparing the objects (e.g., files, directories or other data) and commands (e.g., copying or pasting) recorded in the buffers 16 and 26, i.e., completed in coordination of the application programs 11 and 21. The buffers 16 and 26 respectively store partial data of an entire operation. For example, with respect to a double-clicked file from the first electronic device 1 at the display image 23 of the second electronic device 2, the buffer 26 would have the double-clicked data and coordinate data, and the buffer 16 would have the file name and file path of the double-clicked data. The two applications can then exchange the data to complete the operation.

3. Copying-and-Pasting

Figure 8:
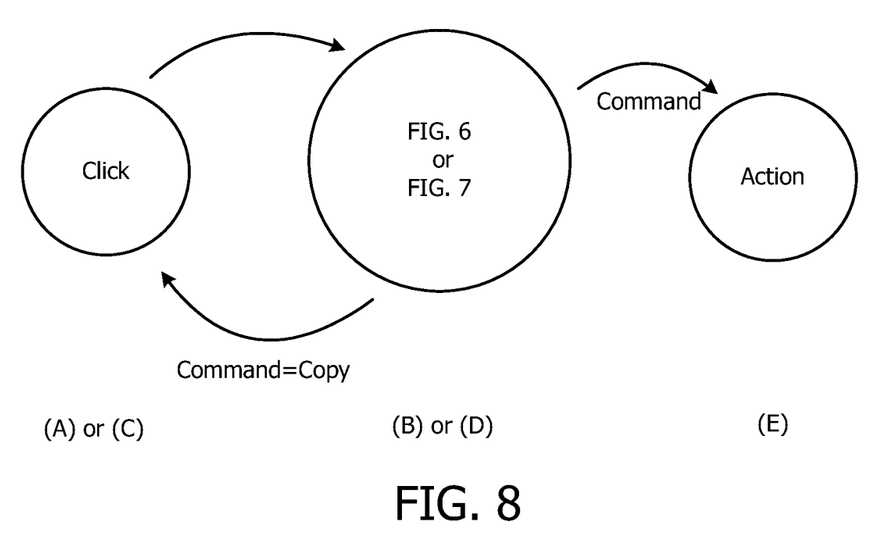
FIG. 8 is a schematic diagram of a copying-and-pasting function.

Operations of this window function can be broken down into steps of: (A) source selecting (left-clicking the mouse); (B) copying (right-clicking the mouse+selecting "copy"); (C) target selecting (left-clicking the mouse); (D) copying (right-clicking the mouse+selecting "paste"); and (E) action, as shown in FIG. 8.

4. Dragging-and-Dropping

Figure 9:
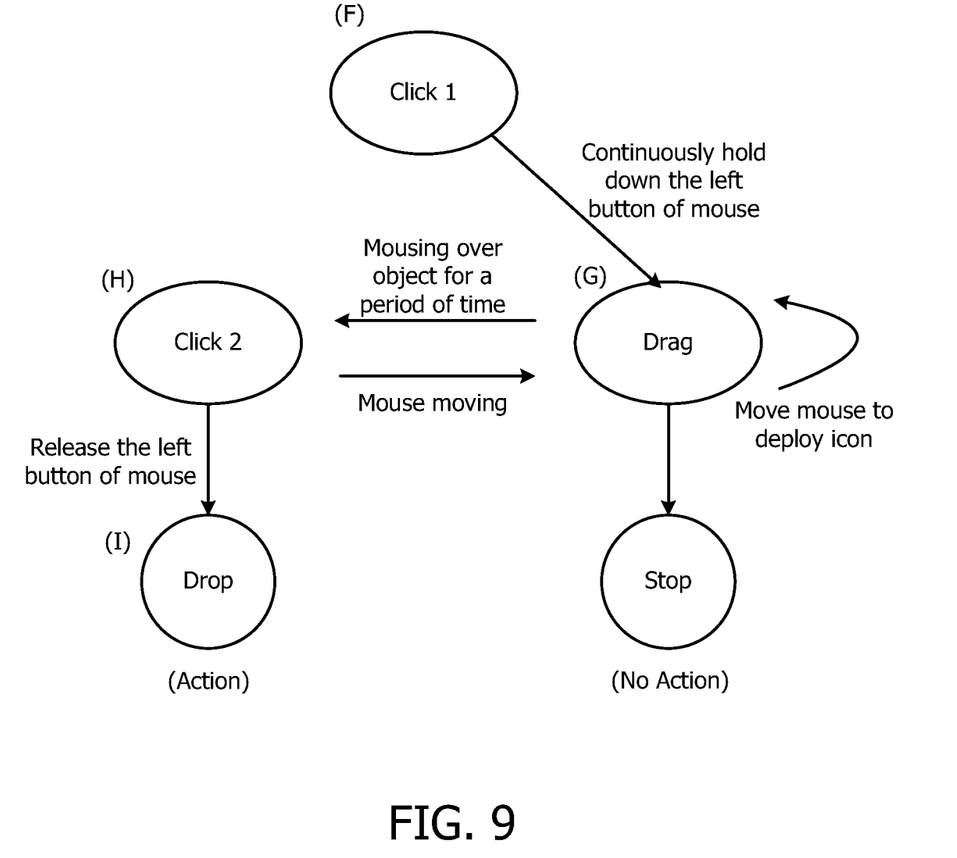
FIG. 9 is a schematic diagram of a dragging-and-dropping function.

Operations of this window function can be broken down into steps of: (F) source selecting (left-clicking the mouse); (G) dragging (moving the mouse while continuously holding down the left button of the mouse); (H) target selecting (mousing over an object for a period of time); and (I) releasing (left button of the mouse). To correspond to the above copying-and-pasting function, step (F) may correspond to step (C) for selecting an object, step (G) may be regarded as the Menu-b and the copying command of step (B), as a particular icon represents a selected object while moving the mouse, step (H) may correspond to step (C) of selecting an object, step (I) may be regarded as Menu-b and the copying command in step (D) for immediately performing the action, as shown in FIG. 9.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A transmission system, comprising:
 a first electronic device, comprising a first composite driver, a first application, a first display image and a first virtual display device;
 a second electronic device, comprising a second application program and a second display image; and
 a transmission controller, electrically connected to the first electronic device and the second electronic device via two transmission interfaces, respectively, wherein said two transmission interfaces are each an Universal Serial Bus (USB) interface;
 wherein the first composite driver emulates the first virtual display device according to the first display image after the transmission controller is electrically connected to the first electronic device; and
 wherein, when the first application program sends output data corresponding to the first virtual display device to the second application program via the transmission interfaces and the transmission controller, a virtual display image corresponding to the first display image is displayed on the second display image.

2. The transmission system as claimed in claim 1, wherein the first electronic device further comprises a first virtual human-machine interface (HMI) device wherein the first composite driver emulates the first virtual HMI device after the transmission controller is electrically connected to the first electronic device, and the second electronic device further comprises a first physical HMI device; when a window operation is performed through the first physical HMI device, the second application program sends coordinates and action data corresponding to the window operation to the first application program via the transmission interfaces and the transmission controller, and the coordinates and action data are converted into input data to the first virtual HMI device.

3. The transmission system as claimed in claim 1, wherein the second electronic device further comprises a second composite driver and a second virtual display device, and the second composite driver emulates the second virtual display device according to the second display image after the transmission controller is electrically connected to the second electronic device; when the second application program sends output data corresponding to the second virtual display device to the first application program via the transmission interfaces and the transmission controller, a virtual display image corresponding to the second display image is presented on the first display image.

4. The transmission system as claimed in claim 3, wherein the first electronic device further comprises a second physical HMI device, and the second electronic device further comprises a second virtual HMI device wherein the second composite driver emulates the second virtual HMI device after the transmission controller is electrically connected to the second electronic device; when a window operation is performed through the second physical HMI device, the first application program sends coordinates and action data corresponding to the window operation to the second application program via the transmission interfaces and the transmission controller, and the coordinates and action data are converted into input data to the second virtual HMI device.

5. A transmission apparatus, electrically connected to a first electronic device and a second electronic device; the first electronic device comprising a first composite driver, a first application program, a first display image and a first virtual display device; the second electronic device comprising a second application program and a second display device; the transmission apparatus comprising:
 a transmission controller; and
 two transmission interfaces, connected to the first electronic device and the second electronic device, respectively, wherein said two transmission interfaces are each an Universal Serial Bus (USB) interface;
 wherein the first composite driver emulates the first virtual display device according to the first display image after the transmission controller is electrically connected to the first electronic device; and
 wherein, when the first application program sends output data corresponding to the first virtual display device to the second application program via the transmission interfaces and the transmission controller, a virtual display image corresponding to the first display image is presented on the second display image.

6. The transmission apparatus as claimed in claim 5, wherein the first electronic device further comprises a first virtual HMI device wherein the first composite driver emulates the first virtual HMI device after the transmission controller is electrically connected to the first electronic device, and the second electronic device further comprises a first physical HMI device; when a window operation is performed through the first physical HMI device, the second application program sends coordinates and action data corresponding to the window operation to the first application program via the transmission interfaces and the transmission controller, and the coordinates and action data are converted into input data to the first virtual HMI device.

7. The transmission apparatus as claimed in claim 5, wherein the second electronic device further comprises a second composite driver and a second virtual display device, and the second composite driver emulates the second virtual display device according to the second display image after the transmission controller is electrically connected to the second electronic device; when the second application program sends output data corresponding to the second virtual display device to the first application program via the transmission interfaces and the transmission controller, a virtual display image corresponding to the second display image is presented on the first display image.

8. The transmission apparatus as claimed in claim 7, wherein the first electronic device further comprises a second physical HMI device, and the second electronic device further comprises a second virtual HMI device wherein the second composite driver emulates the second virtual HMI device after the transmission controller is electrically connected to the second electronic device; when a window operation is performed through the a second physical HMI device, the first application program sends coordinates and action data corresponding to the window operation to the second application program via the transmission interfaces and the transmission controller, and the coordinates and action data are converted into input data to the a second virtual HMI device.

* * * * *